United States Patent
Nanri et al.

(10) Patent No.: US 10,349,322 B2
(45) Date of Patent: Jul. 9, 2019

(54) BASE STATION APPARATUS

(71) Applicant: SoftBank Corp., Tokyo (JP)

(72) Inventors: Masahiko Nanri, Tokyo (JP); Yuichi Hayashi, Tokyo (JP)

(73) Assignee: SoftBank Corp., Tokyo (JP)

( * ) Notice: Subject to any disclaimer, the term of this patent is extended or adjusted under 35 U.S.C. 154(b) by 46 days.

(21) Appl. No.: 15/026,662

(22) PCT Filed: Dec. 4, 2015

(86) PCT No.: PCT/JP2015/084157
§ 371 (c)(1),
(2) Date: Apr. 1, 2016

(87) PCT Pub. No.: WO2016/088877
PCT Pub. Date: Jun. 9, 2016

(65) Prior Publication Data
US 2016/0323787 A1    Nov. 3, 2016

(30) Foreign Application Priority Data

Dec. 4, 2014 (JP) ................................. 2014-245781

(51) Int. Cl.
*H04W 36/04* (2009.01)
*H04W 36/00* (2009.01)
(Continued)

(52) U.S. Cl.
CPC ....... *H04W 36/0083* (2013.01); *H04L 5/0007* (2013.01); *H04L 43/16* (2013.01);
(Continued)

(58) Field of Classification Search
None
See application file for complete search history.

(56) References Cited

U.S. PATENT DOCUMENTS 8,170,547 B1 *   5/2012  Bhan ..................... H04W 24/04
                                                    370/331
8,982,782 B1 *   3/2015  Vargantwar ......... H04W 52/241
                                                    370/328
(Continued)

FOREIGN PATENT DOCUMENTS

JP          2007/518361 A       7/2007
JP          2011-250214 A      12/2011
(Continued)

OTHER PUBLICATIONS

U.S. Appl. No. 62/085,167, "Techniques for Managing Inter-Radio Acess Technology Handovers for High Gain User Equipment", filed Nov. 11, 2014.*
(Continued)

*Primary Examiner* — Christopher M Crutchfield
*Assistant Examiner* — Thinh D Tran
(74) *Attorney, Agent, or Firm* — Muirhead and Saturnelli, LLC

(57) ABSTRACT

A base station apparatus is provided, by which a downlink transmission power can be properly set and frequent handovers of a mobile station (user equipment) can be prevented to occur. The base station apparatus is installed in a base station communicating with a mobile station in a mobile communication network, and provided with control means of controlling so as to decrease a setting of downlink transmission power when changing a setting of offset for handover from the own cell to a neighboring cell so as to advance a hand-out from the own cell to the neighboring cell.

13 Claims, 17 Drawing Sheets

(51) Int. Cl.
*H04W 52/18* (2009.01)
*H04W 52/40* (2009.01)
*H04L 5/00* (2006.01)
*H04W 72/04* (2009.01)
*H04L 12/26* (2006.01)
*H04W 52/34* (2009.01)
*H04W 52/14* (2009.01)

(52) U.S. Cl.
CPC ..... *H04W 36/00837* (2018.08); *H04W 36/04* (2013.01); *H04W 52/18* (2013.01); *H04W 52/343* (2013.01); *H04W 52/40* (2013.01); *H04W 72/042* (2013.01); *H04W 52/143* (2013.01); *Y04S 40/168* (2013.01)

(56) References Cited

U.S. PATENT DOCUMENTS

| | | | |
|---|---|---|---|
| 9,161,279 | B2 | 10/2015 | Kojima |
| 9,681,448 | B2* | 6/2017 | Centonza ............ H04W 72/044 |
| 2005/0152320 | A1 | 7/2005 | Marinier et al. |
| 2005/0265283 | A1* | 12/2005 | Qi ........................ H04W 36/22 370/331 |
| 2008/0181184 | A1 | 7/2008 | Kezys |
| 2009/0005043 | A1 | 1/2009 | Claussen et al. |
| 2011/0171952 | A1* | 7/2011 | Niu ..................... H04L 43/0882 455/422.1 |
| 2011/0244863 | A1* | 10/2011 | Matsuo ................ H04W 36/04 455/436 |
| 2012/0082028 | A1* | 4/2012 | Kojima ................ H04W 36/22 370/230 |
| 2014/0248884 | A1* | 9/2014 | Asada .................. H04W 36/22 455/436 |
| 2015/0079994 | A1* | 3/2015 | Ji ...................... H04W 36/0083 455/436 |
| 2016/0150445 | A1* | 5/2016 | Sandhu ............ H04W 36/0094 370/331 |
| 2016/0353347 | A1* | 12/2016 | Jun ....................... H04W 28/08 |

FOREIGN PATENT DOCUMENTS

| | | |
|---|---|---|
| JP | 2012/80253 A | 4/2012 |
| WO | WO 2005/069519 A1 | 7/2005 |
| WO | WO 2013/126811 A1 | 8/2013 |
| WO | WO 2014/136742 A1 | 9/2014 |

OTHER PUBLICATIONS

Lte, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN)," Overall description; State 2, Release 9, 3GPP TS 36.300, Version 9.10.0, Dec. 2012.

Lte, "3$^{rd}$ Generation Partnership Project; Technical Specification Group Radio Access Network; Evolved Universal Terrestrial Radio Access (E-UTRA); Radio Resource Control (RRC)," Protocol specification; Release 9, 3GPP TS 36.331, Version 9.18.0, Jun. 2014.

Lte, "Evolved Universal Terrestrial Radio Access Network (E-UTRAN); Self-configuring and self-optimizing network (SON) use cases and solutions," 3GPP TR 36.902, Version 9.3.1, Release 9, ETSI TR 136 902, May 2011.

Lte, "Evolved Universal Terrestrial Radio Access Network (E-UTRAN); X2 Application Protocol (X2AP)," 3GPP TS 36.423, Version 9.6.0, Release 9, ETSI TS 136 423, Apr. 2011.

Alcatel-Lucent, ZTE, Mitsubishi, "Direct Connection Requested Instead of indirect via X2GW," 3GPP TSG-RAN WG3 Meeting #85bis, Shanghai, China, Oct. 6-10, 2014, R3-142280, Version 12.3.0.

* cited by examiner (a) Intra Freq/Intra RAT HO (b) Inter Freq/Intra RAT HO (c) Intra Freq/Inter RAT HO (d) Inter Freq/Inter RAT HO

BASE STATION APPARATUS

TECHNICAL FIELD

The present invention relates to a base station apparatus of mobile communication.

BACKGROUND ART

A base station apparatus of performing a handover (HO) processing when a mobile station (hereinafter referred to appropriately as "user equipment (UE: User Equipment)") located in the own cell moves to a neighboring cell of another base station while maintaining a data communication, etc. in a mobile communication is conventionally known (for example, see Non-Patent Literatures 1 and 2).

In order to respond to a recent rapid increase of traffics, for example, in a mobile communication system of the LTE (Long Term Evolution) scheme, a demand for a small-cell base station (hereinafter also sometimes called as "small base station", "Home eNB", or "HeNB") having a cell radius that is further smaller than a cell radius of a conventional macro-cell base station (hereinafter also sometimes called as "MeNB") and pico base station (hereinafter also sometimes called as "PeNB") is increasing. As a result of starting services by this mobile communication system of the LTE scheme, it has become possible to perform a high-speed data communication and to provide various services.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2; Protocol specification" V9.10.0, Chapter 10.
Non-Patent Literature 2: 3GPP TS 36.331 "Evolved Universal Terrestrial Radio Access (E-UTRA); Radio Resource Control (RRC); Protocol specification" V9.18.0, Chapter 5.5.4.4.
Non-Patent Literature 3: 3GPP TS36.902 "Evolved Universal Terrestrial Radio Access Network (E-UTRAN); Self-configuring and self-optimizing network (SON) use cases and solutions" v9.3.1, Chapter 4.6.
Non-Patent Literature 4: 3GPP TS 36.423 "Evolved Universal Terrestrial Radio Access Network (E-UTRAN); X2 application protocol (X2AP); Protocol specification" V9.6.0, Chapter 8.3.6.

SUMMARY OF INVENTION

Technical Problem

Although the theoretical maximum throughput of the LTE reaches to more than 100 [Mbps] (when communicating with a frequency band width (BW) of 15 [MHz] and 2×2 MIMO (multiple-input and multiple-output)), a throughput per a user (hereinafter appropriately called as "user throughput") in the practical service becomes between a few [Mbps] and a few tenths [Mbps] because of sharing the throughput by multiple active users. In particular, in a cell including excessively concentrated users, the user throughput is further reduced and this reduction of user throughput becomes a factor of decreasing in user's satisfaction. For the purpose of solving such reduction of user throughput, a mobility load balancing function (MLB: Mobility Load Balancing) in a base station apparatus is proposed (for example, see the Non-Patent Literature 3). This mobility load balancing function (MLB) is a function of decreasing a load of the own cell by changing a handover-related parameter in a base station and making a UE, which is located in a cell edge, hand over (hand out) to a neighboring cell, mainly in a high-loaded base station. However, when the UE properly existing in each of cells according to a receiving level of signals from each of base stations is handed out in a forced or compulsory manner, the UE after handing out receives high interference. Furthermore, when a plurality of UE concentrates around the center of cell, even if the mobility load balancing function (MLB) is applied, it is not capable of making the UE hand over (hand out) only by adjusting the handover-related parameter. Accordingly, there is a problem that, while the UE after handing out does not receive high interference, a proper load balancing in a base station apparatus is achieved.

Solution to Problem

To solve the foregoing problem, a base station apparatus according to an aspect of the present invention, which is a base station apparatus installed in a base station performing a radio communication with a mobile station in a mobile communication system, comprises control means of controlling so as to decrease a setting of downlink transmission power when changing a setting of offset (Ocn) for handover from the own cell to a neighboring cell so as to advance a hand-out from the own cell to the neighboring cell.

In the foregoing base station apparatus, the base station apparatus may comprise information acquisition means of acquiring load information L1 of the own cell, and the control means may control so as to decrease the offset for handover and the setting of downlink transmission power when the load L1 of the own cell is higher than a predetermined load.

Furthermore, in the foregoing base station apparatus, the base station apparatus may comprise information acquisition means of acquiring load information L1 of the own cell and load information L2 of the neighboring cell, and the control means may control so as to decrease the offset for handover and the setting of downlink transmission power when the difference (L1−L2) between the L1 and the L2 is larger than a preset threshold Lth or the difference (L1−L2) is equal to or larger than the threshold Lth. Herein, the foregoing control means may increment a counter n when the difference (L1−L2) between the L1 and the L2 is larger than the preset threshold Lth or the difference (L1−L2) is equal to or larger than the threshold Lth within a predetermined time, and may control so as to decrease the offset for handover and the setting of downlink transmission power when the value of the counter n is larger than a predetermined number of times Ninc or the value is equal to or larger than the predetermined number of times Ninc.

Moreover, in the foregoing base station apparatus, the control means may only perform the control to decrease the downlink transmission power without performing the setting change of the offset (Ocn) for handover, or the control means may preferentially perform the setting change of the offset (Ocn) for handover and may perform the control to decrease the downlink transmission power after the offset (Ocn) become a predetermined maximum value or minimum value.

Further, in the foregoing base station apparatus, the control means may control so as to increase the setting of downlink transmission power when changing the setting of offset (Ocn) for handover from the own cell to a neighboring cell so as to delay the hand-out from the own cell to the neighboring cell. Herein, the control means may perform the setting change of the offset (Ocn) for handover from the own cell to the neighboring cell to delay the hand-out from the own cell to the neighboring cell and the control to increase the setting of downlink transmission power, when the load L1 of the own cell is lower than a predetermined load. The control means may also perform the setting change of the offset (Ocn) for handover from the own cell to the neighboring cell to delay the hand-out from the own cell to the neighboring cell and the control to increase the setting of downlink transmission power, when the difference (L2−L1) between the L1 and the L2 is larger than a preset threshold Tdec or the difference (L2−L1) is equal to or larger than the threshold Tdec. The control means may also decrement a counter n when the difference (L2−L1) between the L1 and the L2 is larger than the preset threshold Tdec or the difference (L2−L1) is equal to or larger than the threshold Tdec within a predetermined time, and may perform the setting change of the offset (Ocn) for handover from the own cell to the neighboring cell to delay the hand-out from the own cell to the neighboring cell and the control to increase the setting of downlink transmission power, when the value of the counter n is smaller than a predetermined number of times Ndec or the value is equal to or smaller than the predetermined number of times Ndec. The control means may also only perform the control to increase the downlink transmission power without performing the setting change of the offset (Ocn) for handover, or the control means may also preferentially perform the setting change of the offset (Ocn) for handover and perform the control to increase the downlink transmission power after the offset (Ocn) become a predetermined maximum value or minimum value.

Furthermore, the base station apparatus may be a base station apparatus of a small-cell base station or a base station apparatus of a macro-cell base station.

Advantageous Effects of Invention

According to the present invention, it is capable of properly setting a downlink transmission power (transmission output), reducing interference in a mobile station (user equipment) after handing out and achieving a proper load balancing.

DESCRIPTION OF EMBODIMENTS

Hereinafter, embodiments of the present invention are described with reference to the drawings.

Figure 1:
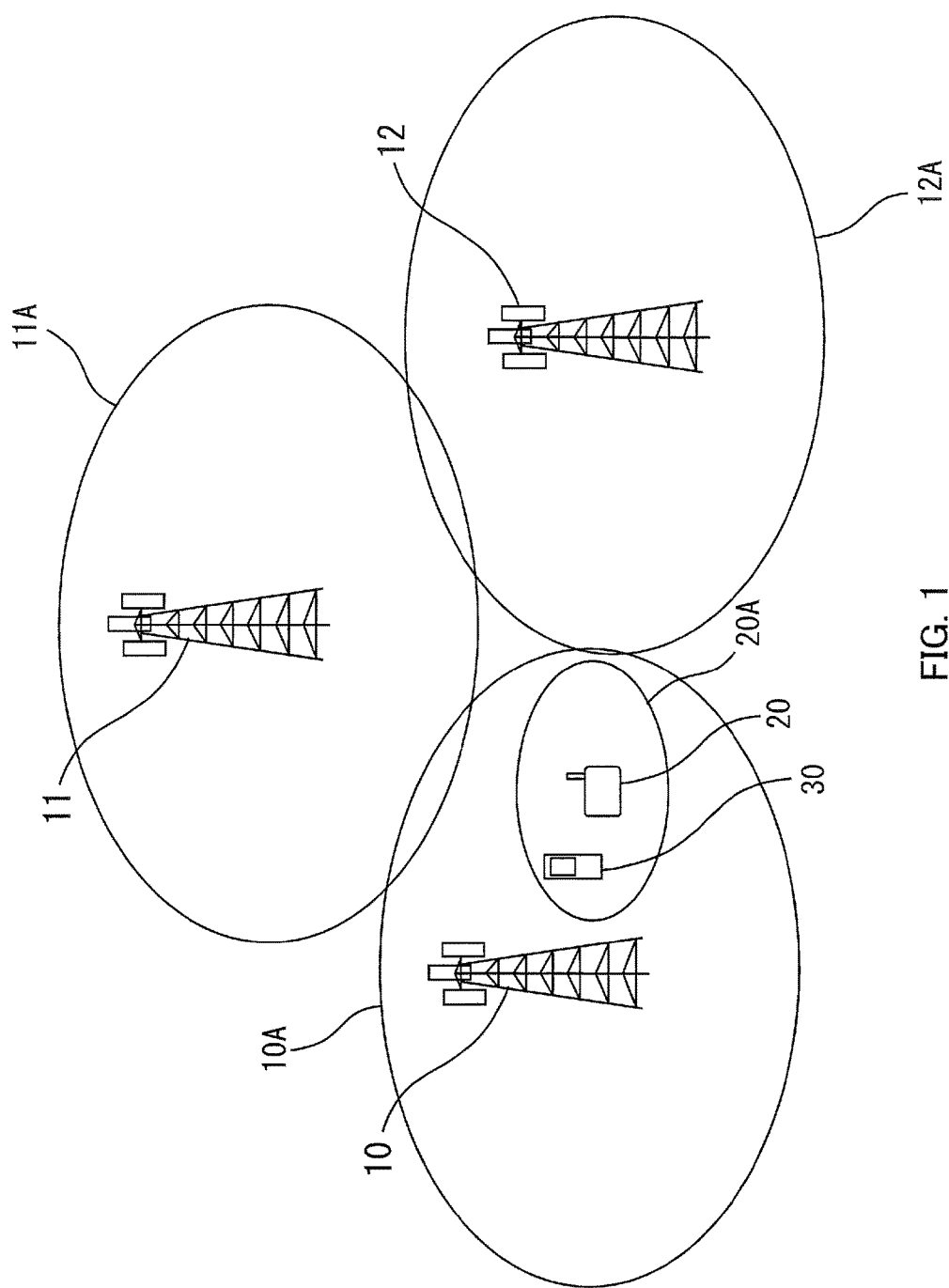
FIG. 1 is an illustration showing a schematic configuration of mobile communication system in which a base station having a base station apparatus is located, according to an embodiment of the present invention.

FIG. 1 is an illustration showing a schematic configuration of mobile communication system in which a base station having a base station apparatus is located, according to an embodiment of the present invention. In FIG. 1, the communication system of this embodiment is a communication system based on the specification of LTE, and includes macro-cell base stations 10, 11 and 12, a small-cell base station 20 located in a macro cell 10A being as a radio communication area of the macro-cell base station 10 which is a one of the foregoing macro-cell base stations. A small cell 20A being as a radio communication area of the small-cell base station 20 is included within the macro cell 10A. In the example shown in the figure, user equipment (UE) 30 being as a mobile station is located in the small cell 20A and is in a state capable of performing radio communications for a telephone and data communication etc. to the small-cell base station. Since the user equipment 30 is also located in an outer peripheral portion (boundary portion with the macro cell 10A) of the small cell 20A within the macro cell 10A, the user equipment 30 is in a situation in which a radio signal transmitted from the user equipment 30 reaches to the macro-cell base station 10 and a radio signal transmitted from the macro-cell base station 10 reaches to the user equipment 30. As a base station located around the small-cell base station 20, there are macro-cell base stations 11 and 12 in addition to the macro-cell base station 10.

It is noted that, although three macro-cell base stations 11, 12 and 13, one small-cell base station 20 and one user equipment 30 are shown in FIG. 1, the number of macro-cell base stations may be smaller than two or larger than four. Furthermore, although some cases, in which the small-cell base station 20 performs processes and controls discussed below, are described in the following embodiments, any other base station such as the macro-cell base station 10 may perform similar processes and controls. Common sections between the three macro-cell base stations are described with respect to the macro-cell base station 10.

The macro-cell base station 10 is a normal wide-area base station installed outdoor in a mobile communication network, which covers a macro cell being a wide area with a radius in a range between about few hundred meters and about several kilometers, and is sometimes called as a "macro-cell base station", "Macro e-Node B", "MeNB" or the like. The macro-cell base station 10 is connected with other base stations via, for example, a wired communication line, and is configured to be capable of communicating by a predetermined communication interface. The macro-cell base station 10 is also connected with a core network of the mobile communication network via a line-termination device and a leased line and is configured to be capable of communicating with various types of nodes in the mobile communication network by a predetermined communication interface.

The small-cell base station 20, which is different from a wide-area macro-cell base station, is a transferable base station capable of being installed indoor such as in a private house, shop, office or the like, and has a radio-communication range between about few meters and about several hundred meters. Since the small-cell base station 20 is installed so as to covering a area smaller than a area covered with a wide-area base station in the mobile communication network, the small-cell base station 20 is sometimes called as a "femto base station" or sometimes called as a "Home e-Node B" or "Home eNB". The small-cell base station 20 is also connected with a core network of the mobile communication network via a line-termination device and a broad-band public communication line such as an ADSL (Asymmetric Digital Subscriber Line), an optical communication line or the like, and is configured to be capable of communicating with various types of nodes in the mobile communication network by a predetermined communication interface.

When being located in the macro cell 10A or the small cell 20A, the user equipment (UE) 30 being as a mobile station used by a user is capable of performing a radio communication with the macro-cell base station 10 or the small-cell base station 20 which corresponds to the serving cell by using a predetermined communication method and a resource.

Figure 2A:
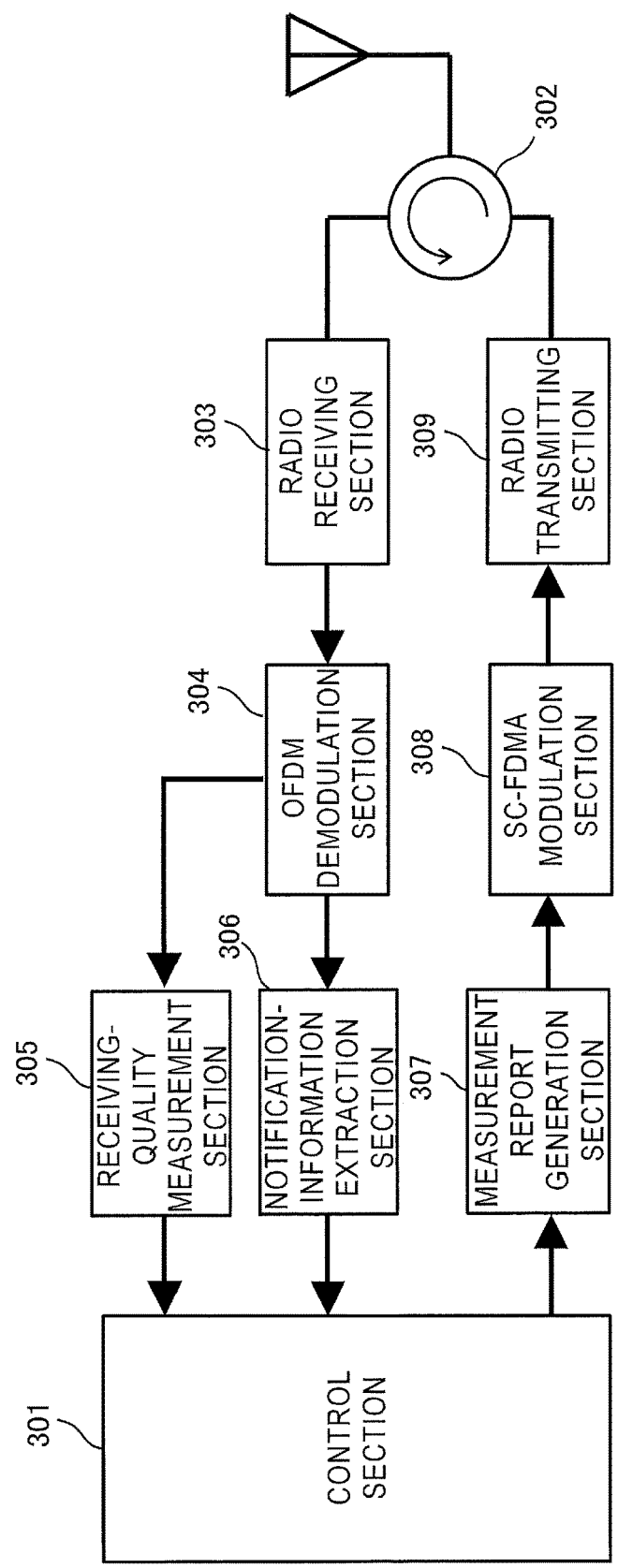
FIG. 2A is a function block diagram showing one example of schematic configuration of a main part of user equipment capable of communicating in the mobile communication system according to the present embodiment.
Figure 2B:
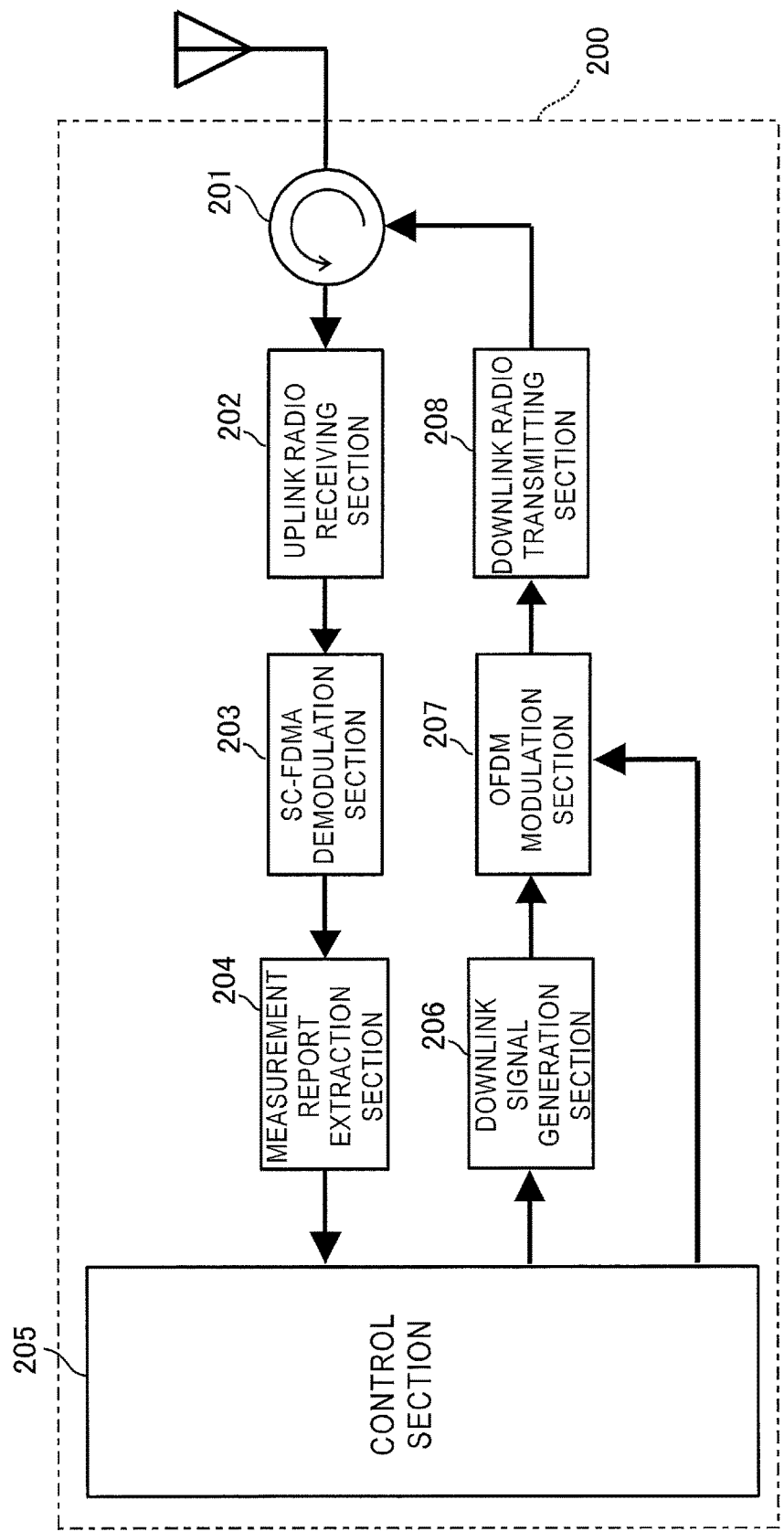
FIG. 2B is a function block diagram showing one example of schematic configuration of a main part of a base station apparatus forming a small-cell base station according to the present embodiment.

FIG. 2A is a function block diagram showing one example of schematic configuration of a main part of the user equipment 30 capable of communicating in the mobile communication system according to the present embodiment. FIG. 2B is a function block diagram showing one example of schematic configuration of a main part of a base station apparatus 200 forming a small-cell base station 20 according to the present embodiment. It is noted that, since a base station apparatus of the macro-cell base station 10 located around the small-cell base station 20 can be configured as same as the small-cell base station 20, a description of the base station apparatus of the macro-cell base station 10 will be omitted.

The user equipment 30 is configured with, for example, hardware such as a computer device having a CPU, memories, etc., a radio communication section and so on, and is capable of performing a radio communication with the base station 10, 20, etc. and the like, by executing a predetermined program. The base station apparatus 200 is configured with, for example, hardware such as a computer device having a CPU, memories, etc., an external communication interface section for the core network, a radio communication section and so on, and is capable of performing various kinds of processes and controls described below such as a memory and update of a list of peripheral base stations neighboring with the small-cell base station 20, a control of downlink transmission power, a measurement of an interference level from a peripheral cell, an interference-processing process and so on, and performing a radio communication with the user equipment 30, by executing a predetermined program.

In FIG. 2A, the user equipment 30 is provided with a control section 301, a transmission and reception sharing device (DUP: Duplexer) 302, a radio receiving section 303, an OFDM (Orthogonal Frequency Division Multiplexing) demodulation section 304, a receiving-quality measurement section 305 and a notification-information extraction section 306. The user equipment 30 is also provided with a measurement-report generation section 307, an SC-FDMA (Single-Carrier Frequency-Division Multiple Access) modulation section 308 and a radio transmitting section 309.

The control section 301, which, for example, is configured with a computer device, controls each section based on notification information extracted by the notification-information extraction section 306, and functions as means of passing information on a downlink-signal receiving quality received by the receiving-quality measurement section 305 to the measurement-report generation section 307.

The radio receiving section 303 receives a radio signal modulated with an OFDM system for downlink specified by the LTE from the base stations 10 and 20 via an antenna and the transmission and reception sharing device 302.

The OFDM demodulation section 304 acquires a reception signal by demodulating the radio signal modulated with the OFDM system.

The receiving-quality measurement section 305 measures a downlink receiving quality (for example, electric field intensity, receiving level, etc.) when receiving the downlink radio signal, from the demodulated by the OFDM demodulation section 304, and passes information (RSRP: Reference Signal Received Power) on the measured downlink receiving quality to the control section 301.

The notification-information extraction section 306 extracts notification information (for example, cell-identification information such as a CGI, a cell ID or the like, location-registration area information such as a TAC or the like, control channel information, network version information, etc.) transmitted by the base stations 10 and 20, from the reception signal demodulated by the OFDM demodulation section 304, and passes the extracted notification information to the control section 301.

The measurement-report generation section 307 generates a transmission signal being as a measurement report (Measurement Report) that is periodically transmitted from the user equipment 30, based on the information on downlink receiving quality (RSRP) and the notification information received from the control section 301.

The SC-FDMA modulation section 308 modulates various kinds of baseband transmission signals by using a SC-FDMA (Single-Carrier Frequency-Division Multiple Access) system for uplink specified in the LTE. Particularly, in the present example, by the SC-FDMA modulation section 308, the transmission signal of Measurement Report generated by the measurement-report generation section 307 is modulated with the SC-FDMA system.

The radio transmitting section 309 transmits the transmission signal such as the Measurement Report modulated by the SC-FDMA modulation section 308 to the base stations 10 and 20 via the transmission and reception sharing device 302 and the antenna.

In the description herein, the foregoing Measurement Report is a transmission signal including the downlink electric field intensity (RSRP), receiving quality information (RSRQ), frequency information of the cell and the cell-identification information such as the CGI, cell ID, etc. which are notified to the base stations 10 and 20 by the user equipment 30. As a physical channel for transmitting the Measurement Report, for example, a PUSCH (Uplink Shared Channel) format 2 being as a shared channel for uplink specified in the LTE is used. Radio resources (time, frequency) used for transmitting the Measurement Report are designated by the base stations 10 and 20.

In FIG. 2B, the base station apparatus 200 is provided with a transmission and reception sharing device (DUP) 201, a uplink radio receiving section 202, an SC-FDMA demodulation section 203 and a Measurement Report extraction section 204. The base station apparatus 200 is also provided with a control section 205 that performs a control of transmitting power and the like, a downlink signal generation section 206, an OFDM modulation section 207 and a downlink radio transmitting section 212. It is noted that the base station apparatus 200 may include an antenna.

The uplink radio receiving section 202 receives an uplink radio signal, which is transmitted by the user equipment 30 communicating with the base station 200, via the transmission and reception sharing device 201. This radio signal includes noise signals such as a white noise generated in the uplink radio receiving section 202 or the like, and a radio signal in a predetermined radio resource and physical channel that are set in the aforementioned Measurement Report. When user equipment (MUE) communicating with the macro-cell base station 10 neighboring with the small-cell base station 20 is present, the uplink radio signal also includes an uplink signal transmitted from the user equipment (MUE).

The SC-FDMA demodulation section 203 performs a demodulation process with an SC-FDMA system for a receiving signal received by the uplink radio receiving section 202.

The Measurement Report extraction section 204 extracts information corresponding to the Measurement Report transmitted from the user equipment 30 that communicates with the base station including the base station apparatus 200 with the present configuration, from the receiving signal in the predetermined radio resource and physical channel which is obtained by the demodulation process with the SC-FDMA demodulation section 203, and passes the information to the control section 205.

The control section 205 has a memory such as a RAM, ROM or the like and functions as memory means of memorizing various kinds of setting information such as various kinds of parameters relating to handovers and a downlink transmission power.

Moreover, the control section 205 also functions as various kinds of means exemplified in the following (1)-(9). It is noted that more specific examples of a process and control of each means are described below.

(1) Measurement means of measuring a time interval between a timing of receiving a handover request from the macro-cell base station 10 when the user equipment 30 performs a hand-in from a macro cell 10A to a small cell 20A and a timing of receiving information showing a failure of handover from the macro cell 10A to the small cell 20A, from the macro-cell base station 10, in sate that the small-cell base station 20 is located in the macro cell 10A or neighboring the macro cell 10A, (2) Measurement means of measuring a time interval between a timing of transmitting a connection setting signal to the user equipment 30 when the user equipment 30 performs a hand-in from the macro cell 10A to the small cell 20A and a timing of transmitting a handover request to the macro-cell base station 10 following a hand-out of the user equipment 30 from the small cell 20A, in sate that the small-cell base station 20 is located in the macro cell 10A or neighboring the macro cell 10A, (3) Control means of controlling so as to decrease a setting of downlink transmission power based on the time interval measured by the foregoing measurement means, (4) Control means of controlling so as to decrease a setting of downlink transmission power when changing a setting of offset (Ocn) for handover from the own cell to a neighboring cell so as to advance a hand-out from the own cell to the neighboring cell, and (5) Information acquisition means of acquiring load information L1 of the own cell, or information acquisition means of acquiring load information L1 of the own cell and load information L2 of the neighboring cell.

The downlink signal generation section 206 generates a downlink signal to be transmitted to the user equipment 30 located in the cell 20A of the own base station.

The OFDM modulation section 207 modulates the downlink signal generated by the downlink signal generation section 206 with the OFDM system so that the downlink signal is transmitted with a transmission power determined by the control section 205.

The downlink radio transmitting section 208 transmits the transmission signal modulated by the OFDM modulation section 207 via the transmission and reception sharing device 201 and the antenna.

Next, the following describes a control (DPC: Downlink Power Control) of changing a setting of downlink transmission power (transmission output) in the base station apparatus of the present embodiment.

Embodiment 1

Figure 3A:
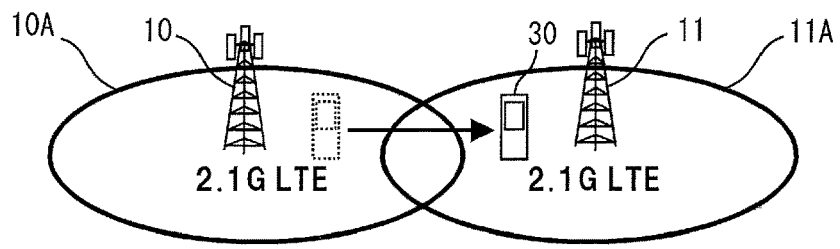
FIG. 3A is an illustration showing a kind of handover in a general mobile communication system.

FIGS. 3A-3D are illustrations showing kinds of handover in a general mobile communication system. Handovers (HOs) in the mobile communication network are classified in to the following four kinds based on a frequency and radio access system of the HO destination (for example, see the Non-Patent Literature 1). For example, FIG. 3A shows a HO with the same frequency (for example, 2.1 GHz band) and the same radio access system (for example, LTE→LTE). The control of each embodiment described below can be applied to any one of these four kinds of handovers.

Figure 3B:
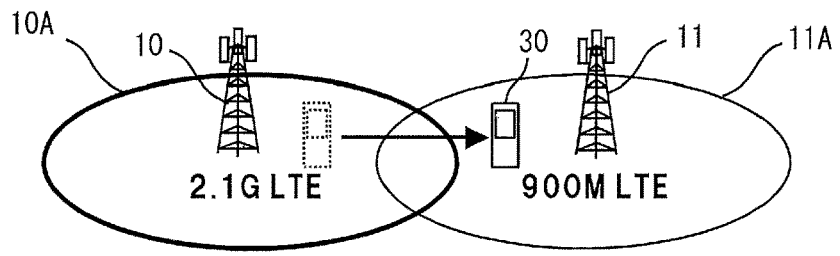
FIG. 3B is an illustration showing a kind of handover in a general mobile communication system.
Figure 3C:
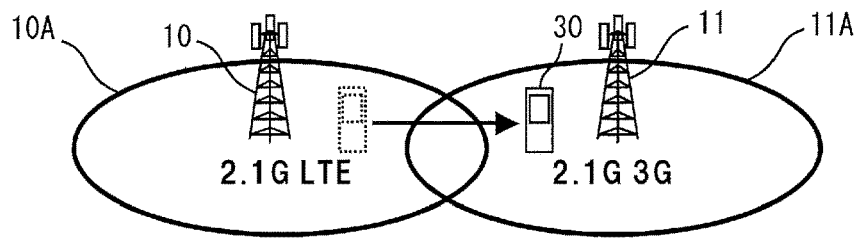
FIG. 3C is an illustration showing a kind of handover in a general mobile communication system.
Figure 3D:
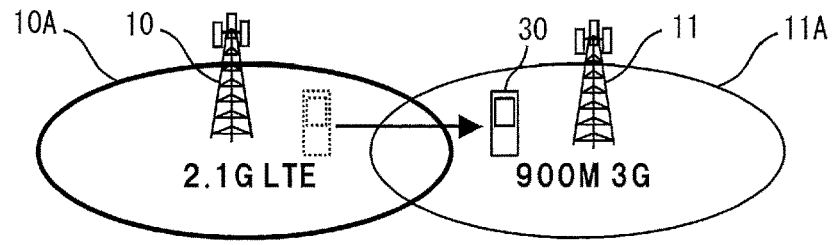
FIG. 3D is an illustration showing a kind of handover in a general mobile communication system.

FIG. 3A: Intra Freq/Intra RAT HO,

FIG. 3B: Inter Freq/Intra RAT HO,
FIG. 3C: Intra Freq/Inter RAT HO (including CS fallback), and
FIG. 3D Inter Freq/Inter RAT HO (including CS fallback).

Figure 4:
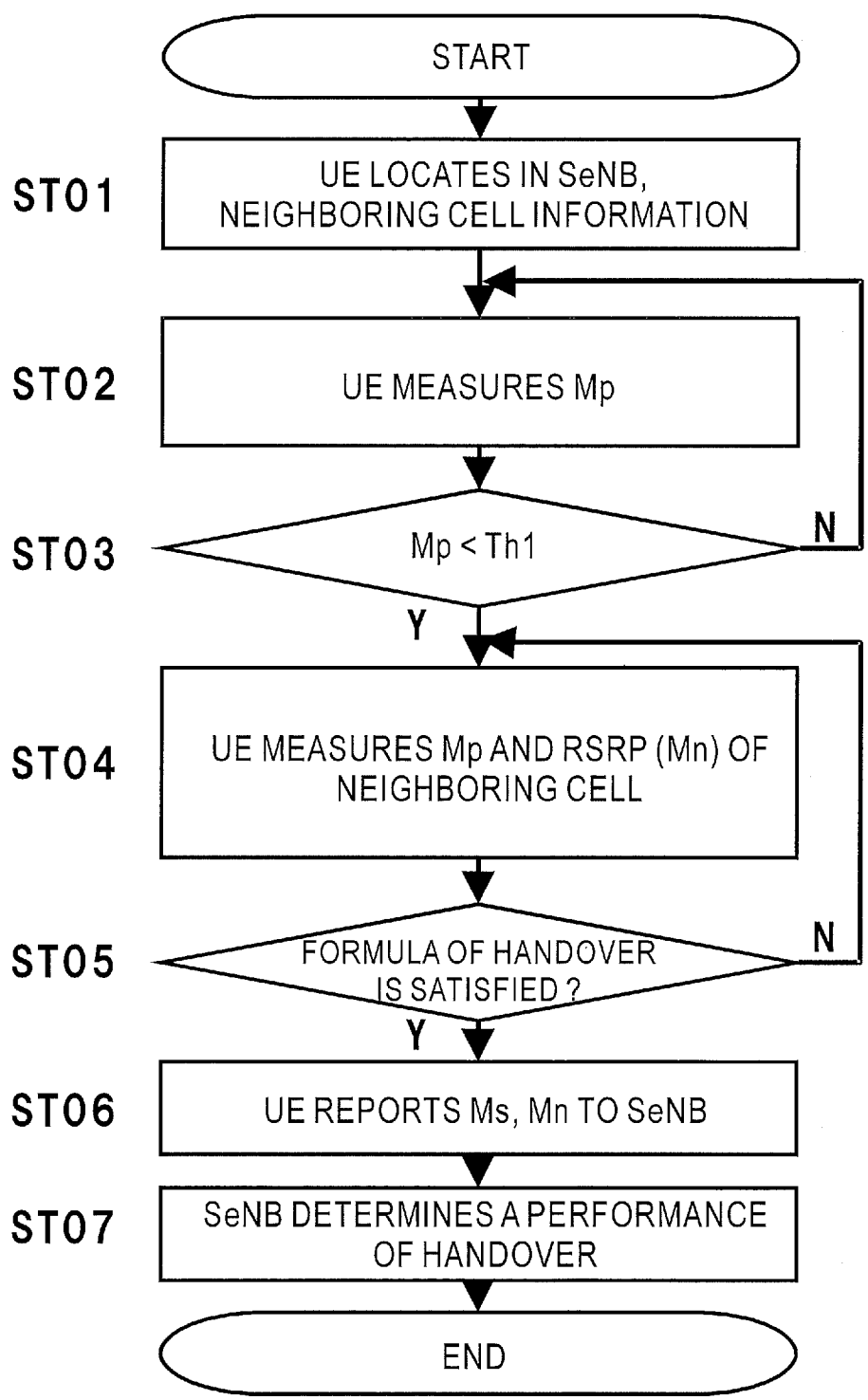
FIG. 4 is a flowchart showing an example of operation in state of the handover in FIG. 3A.
Figure 5:
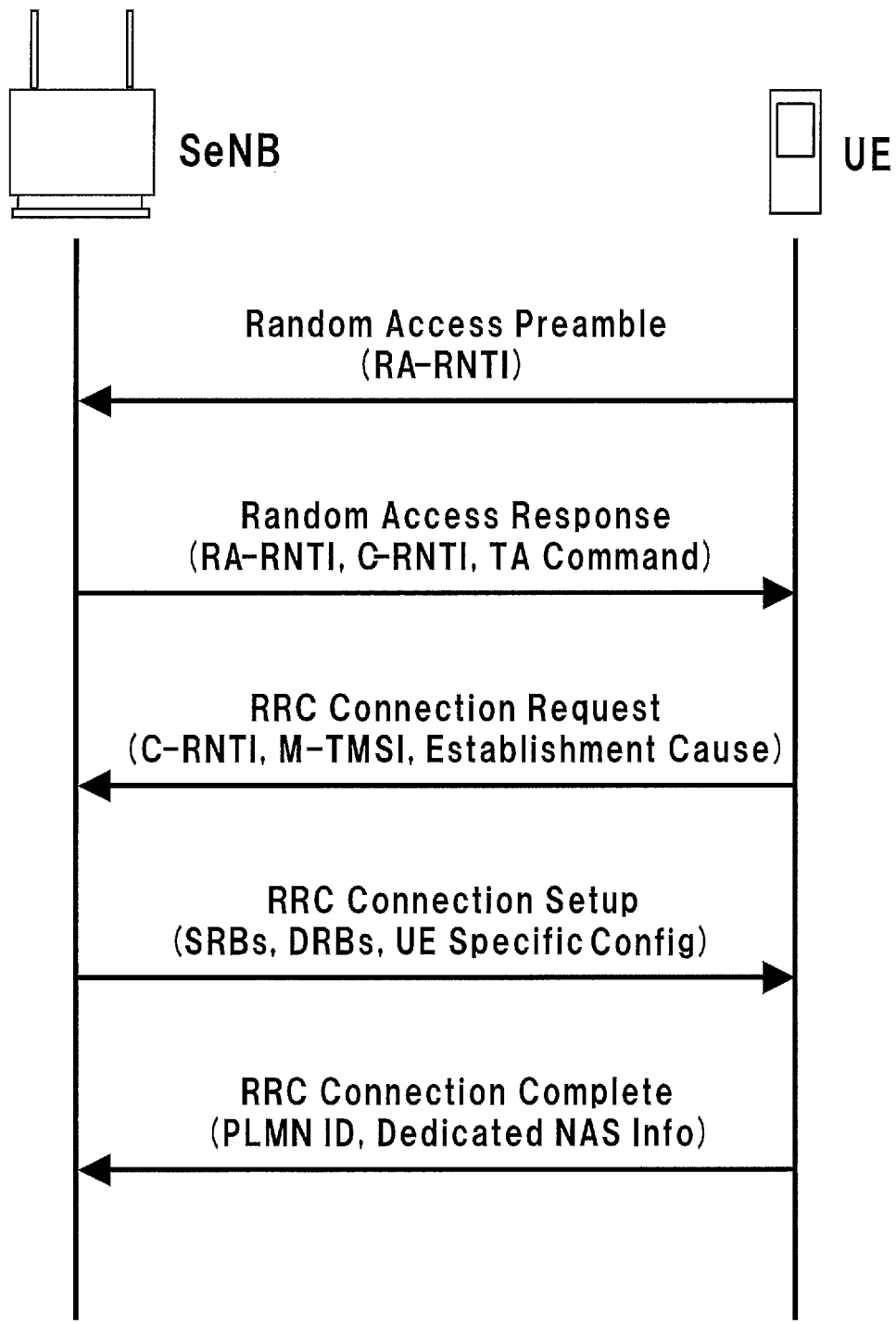
FIG. 5 is a flowchart and sequence diagram showing an example of operation in state of the same handover.

FIGS. 4 and 5 are flowcharts and sequence diagram showing an example of operation in state of the handover (Intra Freq/Intra RAT HO) in FIG. 3A (for example, see the Non-Patent Literature 2). In the present example of operation, it is determined whether a handover is necessary or not based on a pilot signal power (RSRP: Reference Signal Received Power) being as a signal intensity or a pilot signal quality (RSRQ: Reference Signal Received. Quality) being as a signal quality, which are received from the UE (user equipment). It is noted that the principle of operation is the same for each of the handovers in FIGS. 3B-3D.

In the example of operation in FIG. 4, a handover is performed by following procedures of ST01-ST07.

ST01: When the UE locates in a Source eNB that is to be a connection destination, the UE receives neighboring-cell information transmitted by a Serving eNB (SeNB) at the same time.

ST02: The UE periodically measures a pilot signal power (RSRP) Mp of the SeNB.

ST03: The UE compares the Mp with a predetermined a first threshold (Th1). When the Mp is smaller than the Th1, the UE transits to ST04.

ST04: The UE measures an RSRP (Mn) of the neighboring cell based on the neighboring-cell information acquired at ST01 in addition to the Mp.

ST05: When the Mn and Mp satisfy a predetermined conditional expression for handover, the UE transits to ST06.

ST06: The UE reports the Mp and Mn to the SeNB.

ST07: The SeNB determines whether a HO is to be performed or not based on the Mp and Mn reported from the UE.

As the foregoing conditional expression for handover, for example, a following expression is used.

Conditional Expression for Handover:

$$Mn+Ofn+Ocn-Hys>Mp+Ofp+Ocp+Off$$

Mn: Receiving power of neighboring cell (RSRP [dBm] or RSRQ [dB])

Ofn: Weight coefficient added to frequency of neighboring cell [dB]

Ocn: Fixed offset added for each neighboring cell [dB]

Hys: Hysteresis added to receiving power of neighboring cell [dB]

Mp: Receiving power of own cell (RSRP [dBm] or RSRQ [dB])

Ofp: Weight coefficient added to frequency of own cell [dB]

Ocp: Fixed offset added for each own cell [dB]

Off: Offset added to receiving power of own cell [dB]

In a MRO (Mobility Robustness Optimization) for improving quality in a general handover, a timing of handover is adjusted by setting the offset Ocn that is one of the parameters in the foregoing conditional expression for handover (see the Non-Patent Literature 2) as follows:

Increase of Ocn: by which it becomes easy to handover (timing of handover is advanced).

Decrease of Ocn: by which it becomes difficult to handover (timing of handover is delayed).

In the general handover shown in the foregoing examples of handover, in case that an area in which the RSRP of the small-cell base station (HeNB) is strong is closed within a building, since a HO occurs when a user goes into or out of the building, it is hard to cause a failure of handover.

In case that the area in which the RSRP of the small-cell base station (HeNB) is strong extends out of the building, since a user is instantaneously present in the small cell and immediately after that, the handover to the neighboring macro cell, it is easy to cause a failure of handover.

When the small-cell base station (HeNB) detects a failure of handover due to the instantaneous hand-in and hand-out, it is capable of preventing the failure of handover by decreasing the foregoing value of offset (Ocn) and delaying the timing of HO.

However, in the aforementioned conventional MRO, it is difficult to eliminate the failure of handover during the UE is moving at high speed as in case that a user is moving by car.

Accordingly, in the base station apparatus 200 of the small-cell base station 20 according to the present embodiment, as shown in the followings, it is surely prevented that an error of handover (HO) occurs due to the leakage of radio waves out of the building, that is, frequent handovers of the UE (user equipment) 30 occurs, and a success rate of handovers is improved, by controlling to decrease a setting of downlink transmission power in addition to the conventional adjustment of the offset (Ocn).

Figure 6:
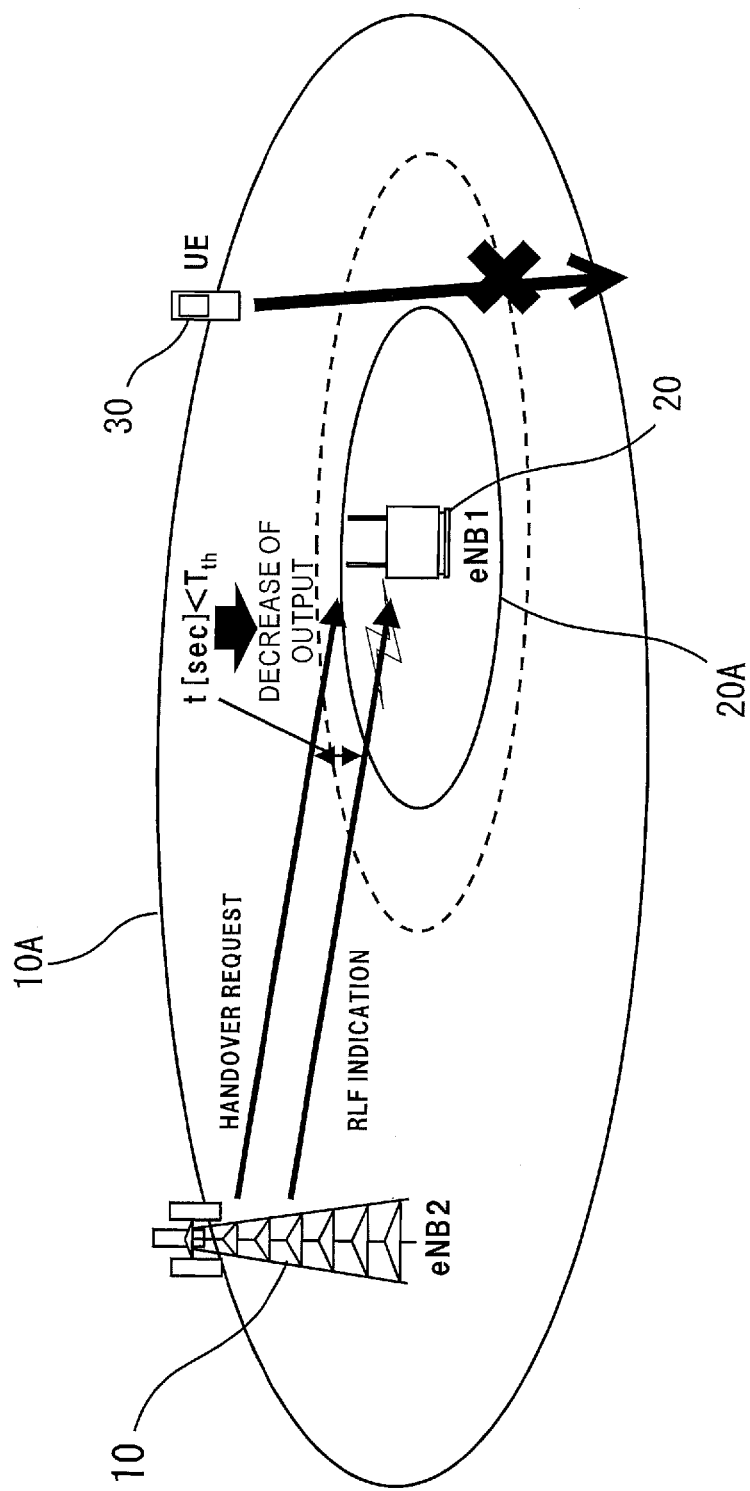
FIG. 6 is an illustration showing an example of controlling a downlink transmission power when performing a handover, according to a first embodiment of the present invention.
Figure 7:
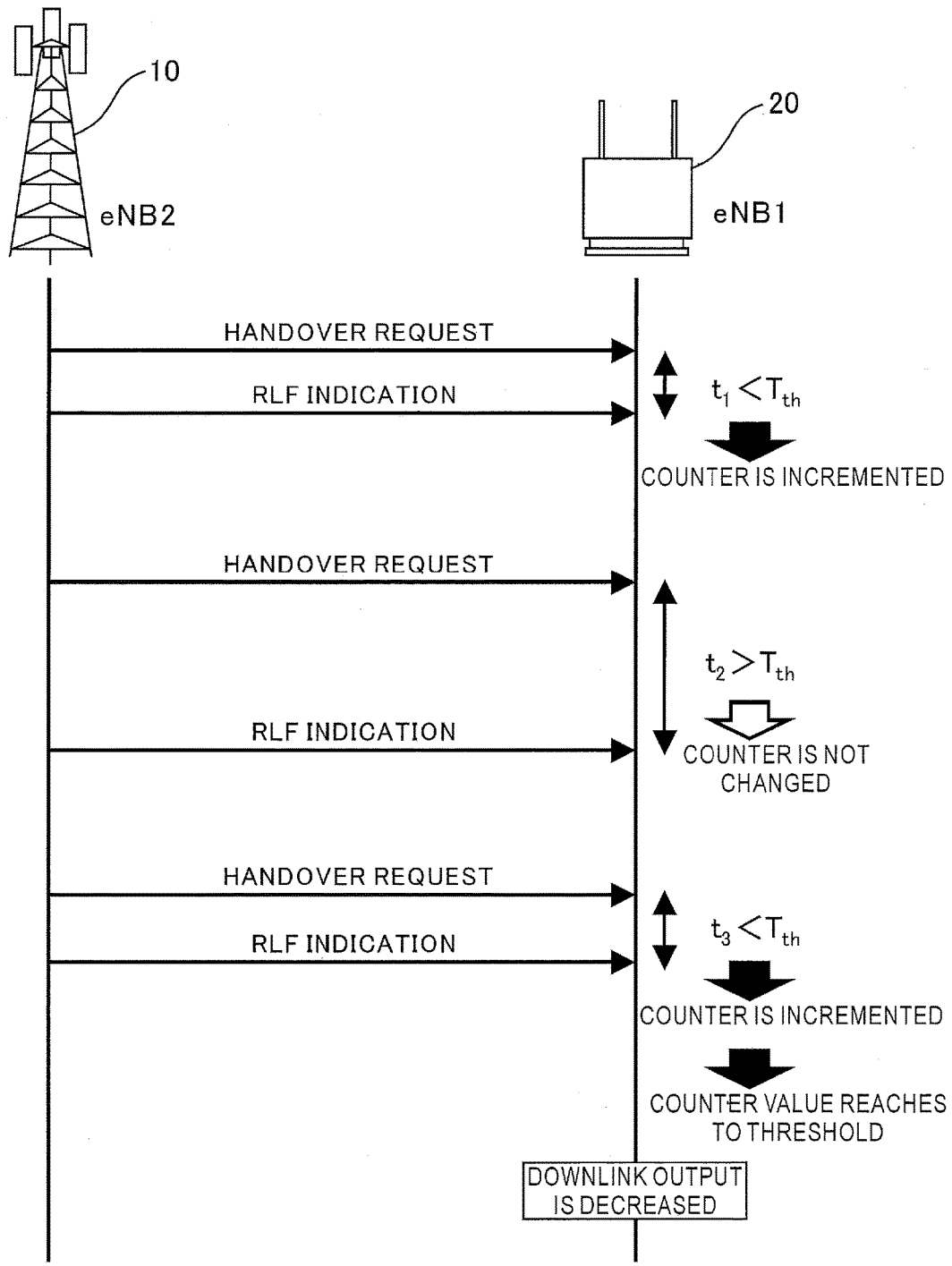
FIG. 7 is a sequence diagram showing the same example of controlling the downlink transmission power.

FIG. 6 is an illustration showing an example of controlling a downlink transmission power when performing a handover, according to a first embodiment of the present invention. FIG. 7 is a sequence diagram showing the same example of controlling the downlink transmission power. It is noted that, in FIGS. 6 and 7, the base station eNB2 is a macro-cell base station 10 and the base station eNB1 is a small-cell base station 20 located in the macro cell 10A.

In the present example of control, as shown in the following procedures (1) to (5), the eNB1 measures a time interval (t [sec]) between a timing of receiving a HO request signal (HANDOVER REQUEST) from the eNB2 and a timing of receiving information (RLF INDICATION) on a failure of handover, and controls to decrease the downlink transmission power (downlink transmission output) of the own base station when an event in which the time interval (t [sec]) is shorter than a predetermined value frequently occurs in a short time (1) The eNB1 receives a handover request (HANDOVER REQUEST) from the eNB2, following a hand-in of the UE existing in the cell of eNB2. At the same time, the eNB1 starts a timer.

(2) When the HO of UE is failed, the eNB1 receives a signal showing a failure of handover from the eNB2. At the same time, the eNB1 stops the timer.

(3) When the value of timer (t1) is smaller than a predetermined threshold (Tth), the eNB1 determines that the UE moving at high speed is detected and increments a counter.

(4) When the value of counter reaches a predetermined value within a unit time, the eNB1 decreases the setting of downlink transmission power (output of downlink transmission signals).

(5) On the other hand, when the value of counter does not reach the predetermined value within a unit time, the eNB1 returns the setting of downlink transmission power (output of downlink transmission signals) to the initial value.

According to the foregoing example of control in FIGS. 6 and 7, the base station apparatus 200 of the small-cell base station 20 controls so as to decrease the setting of downlink transmission power in addition to the conventional adjustment of the offset (Ocn). By this control, it is capable of surely preventing that an error of handover (HO) occurs due to the leakage of radio waves out of the building, that is, frequent handovers of the UE (user equipment) 30 occurs, and improving a success rate of handovers.

It is noted that, in the foregoing procedure (3) of the example of control in FIGS. 6 and 7, when the value of timer (t1) is equal to or smaller than the predetermined threshold (Tth), the eNB1 may determine that the UE moving at high speed is detected and increment the counter.

In the foregoing procedure (4), when the value of counter becomes larger than the predetermined value within a unit time, the eNB1 may decrease the setting of downlink transmission power (output of downlink transmission signals), and when the value of counter becomes equal to or smaller than the predetermined value within a unit time, the eNB1 may return the setting of downlink transmission power (output of downlink transmission signals) to the initial value.

Furthermore, in the foregoing example of control in FIGS. 6 and 7, while not using the foregoing timer, when the foregoing time interval t [sec] is smaller than a preset threshold Tth [sec], or the time interval t [sec] is equal to or smaller than the threshold Tth, the setting of downlink transmission power (output of downlink transmission signals) may be decreased.

Embodiment 2

Figure 8:
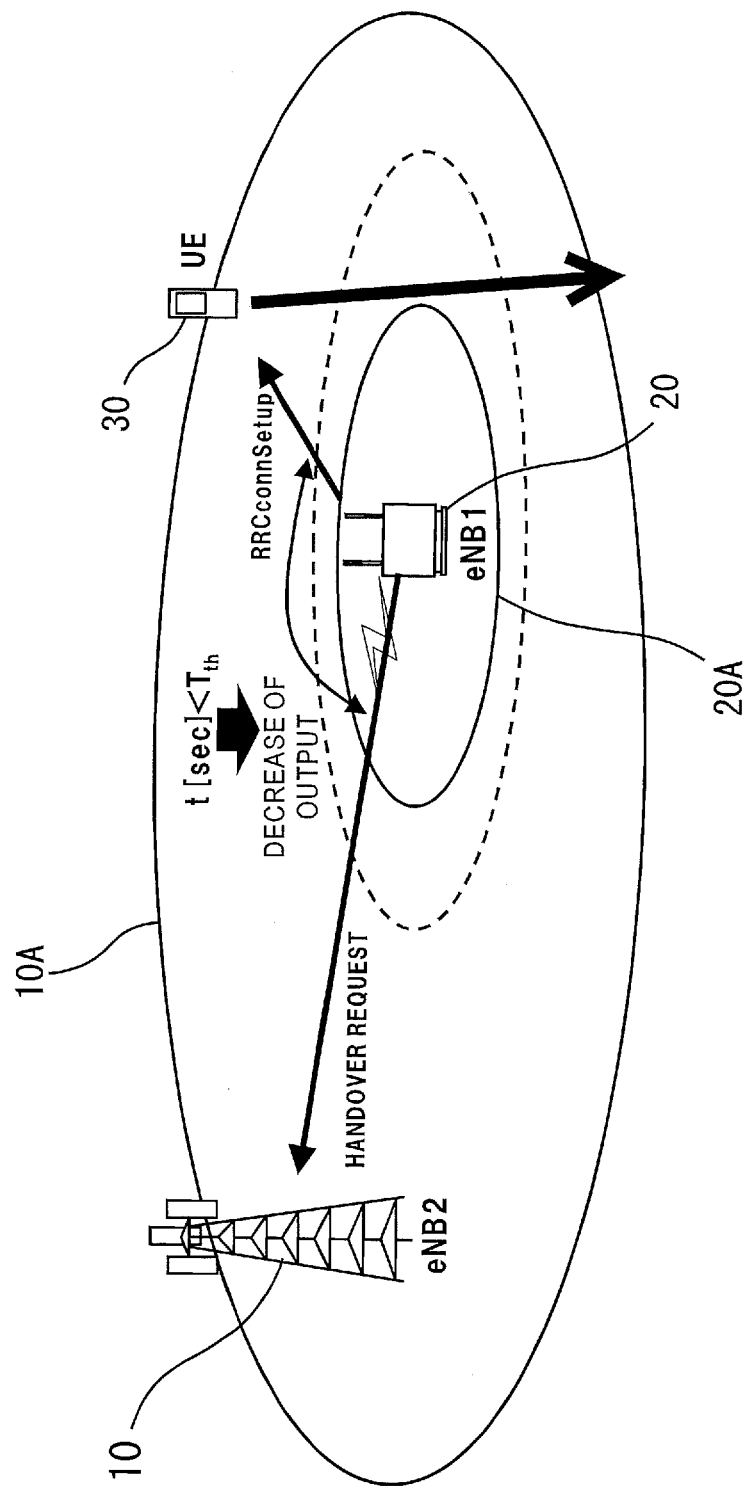
FIG. 8 is an illustration showing an example of controlling a downlink transmission power when performing a handover, according to a second embodiment of the present invention.
Figure 9:
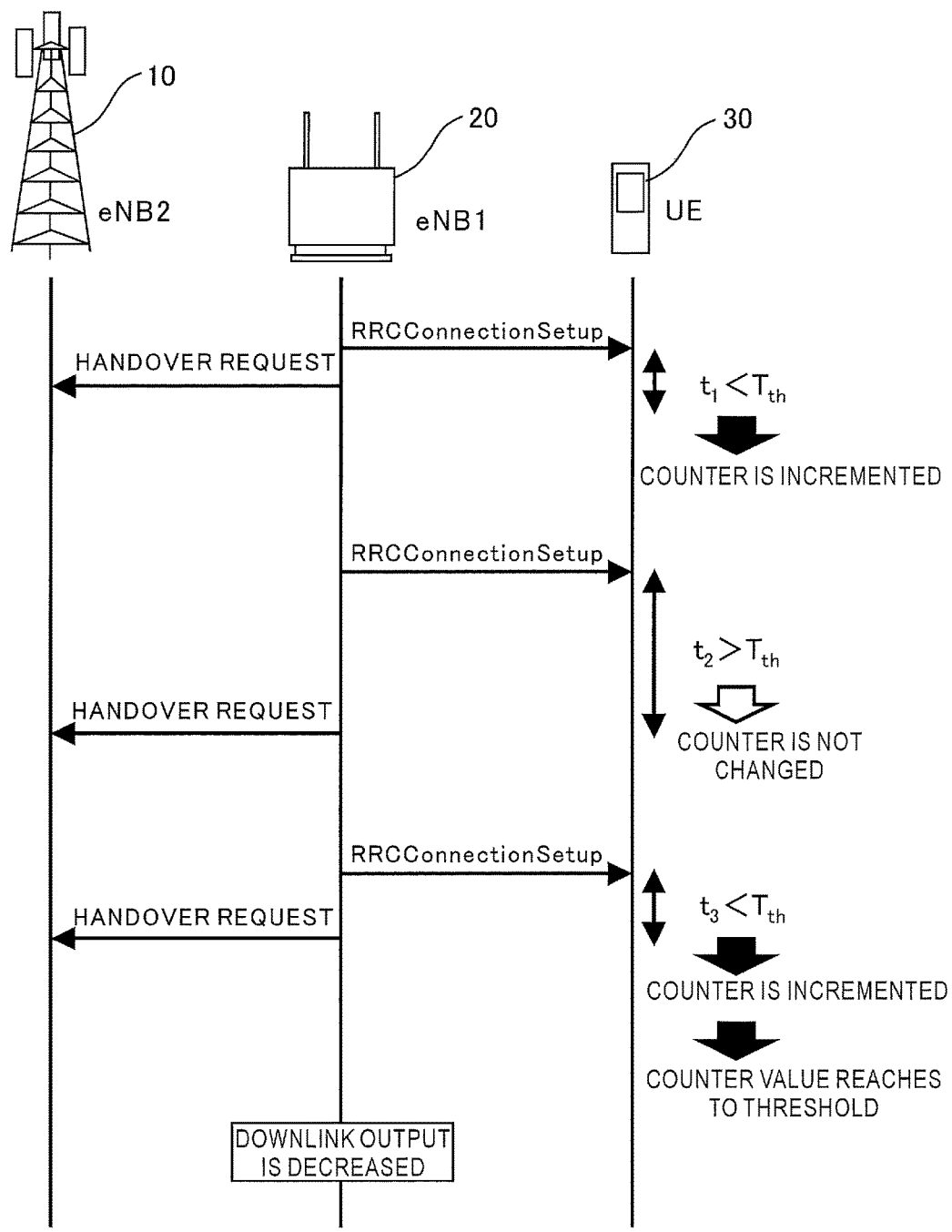
FIG. 9 is a sequence diagram showing the same example of controlling the downlink transmission power.

FIG. 8 is an illustration showing an example of controlling a downlink transmission power when performing a handover, according to a second embodiment of the present invention. FIG. 9 is a sequence diagram showing the same example of controlling the downlink transmission power. It is noted that, in FIGS. 8 and 9, the base station eNB2 is a macro-cell base station 10 and the base station eNB1 is a small-cell base station 20 located in the macro cell 10A.

In the present example of control, as shown in the following procedures (1) to (5), the eNB1 measures a time interval (t [sec]) between a timing of transmitting a connection setup signal (RRCConnectionSetup) that is transmitted following a hand-in of the UE and a timing of transmitting a handover request (HANDOVER REQUEST) that is transmitted to the eNB2 following a hand-out of the UE, and controls to decrease the downlink output of the own base station when an event in which the time interval (t [sec]) is shorter than a predetermined value frequently occurs in a short time.

(1) When the UE hands over to the own cell, the eNB1 transmits a connection setup signal (RRCConnectionSetup) to the UE. At the same time, the eNB1 starts a timer.

(2) When the UE hands over to the eNB2, the eNB1 transmits a handover request (HANDOVER REQUEST) to the eNB2. At the same time, the eNB1 stops the timer.

(3) When the value of timer (t1) is smaller than a predetermined threshold (Tth), the eNB1 determines that the UE moving at high speed is detected and increments a counter.

(4) When the value of counter reaches a predetermined value within a unit time, the eNB1 decreases the output of downlink transmission signals.

(5) On the other hand, when the value of counter does not reach the predetermined value within a unit time, the eNB1 returns the output of downlink transmission signals to the initial value.

According to the foregoing example of control in FIGS. 8 and 9, the base station apparatus 200 of the small-cell base station 20 controls so as to decrease the setting of downlink transmission power in addition to the conventional adjustment of the offset (Ocn). By this control, it is capable of surely preventing that an error of handover (HO) occurs due to the leakage of radio waves out of the building, that is, frequent handovers of the UE (user equipment) 30 occurs, and improving a success rate of handovers.

In particular, according to the foregoing example of control in FIGS. 8 and 9, it is capable of detecting the UE moving at high speed even when a failure of HO does not occur.

It is noted that, in the foregoing procedure (1) of the example of control in FIGS. 8 and 9, instead of the connection setup signal (RRCConnectionSetup) from the eNB1 to the UE, a connection-setup complete signal may be used, which is transmitted by the UE to the eNB1 when completing the RRC Connection Setup.

Furthermore, in the foregoing procedure (3) of the example of control in FIGS. 8 and 9, when the value of timer (t1) is equal to or smaller than the predetermined threshold (Tth), the eNB1 may determine that the UE moving at high speed is detected and increment the counter.

Moreover, in the foregoing procedure (4), when the value of counter becomes larger than the predetermined value within a unit time, the eNB1 may decrease the output of downlink transmission signals, and when the value of counter becomes equal to or smaller than the predetermined value within a unit time, the eNB1 may return the setting of downlink transmission power (output of downlink transmission signals) to the initial value.

Further, in the foregoing example of control in FIGS. 8 and 9, while not using the foregoing timer, when the foregoing time interval t [sec] is smaller than a preset threshold Tth [sec], or the time interval t [sec] is equal to or smaller than the threshold Tth, the setting of downlink transmission power (output of downlink transmission signals) may be decreased.

Each of the embodiment 1 (example of control in FIGS. 6 and 7) and the embodiment (example of control in FIGS. 8 and 9) may be performed without the foregoing adjustment of the offset (Ocn).

Furthermore, the embodiment 1 (example of control in FIGS. 6 and 7) and the embodiment (example of control in FIGS. 8 and 9) may be performed by combining with each other.

Embodiment 3

Figure 10:
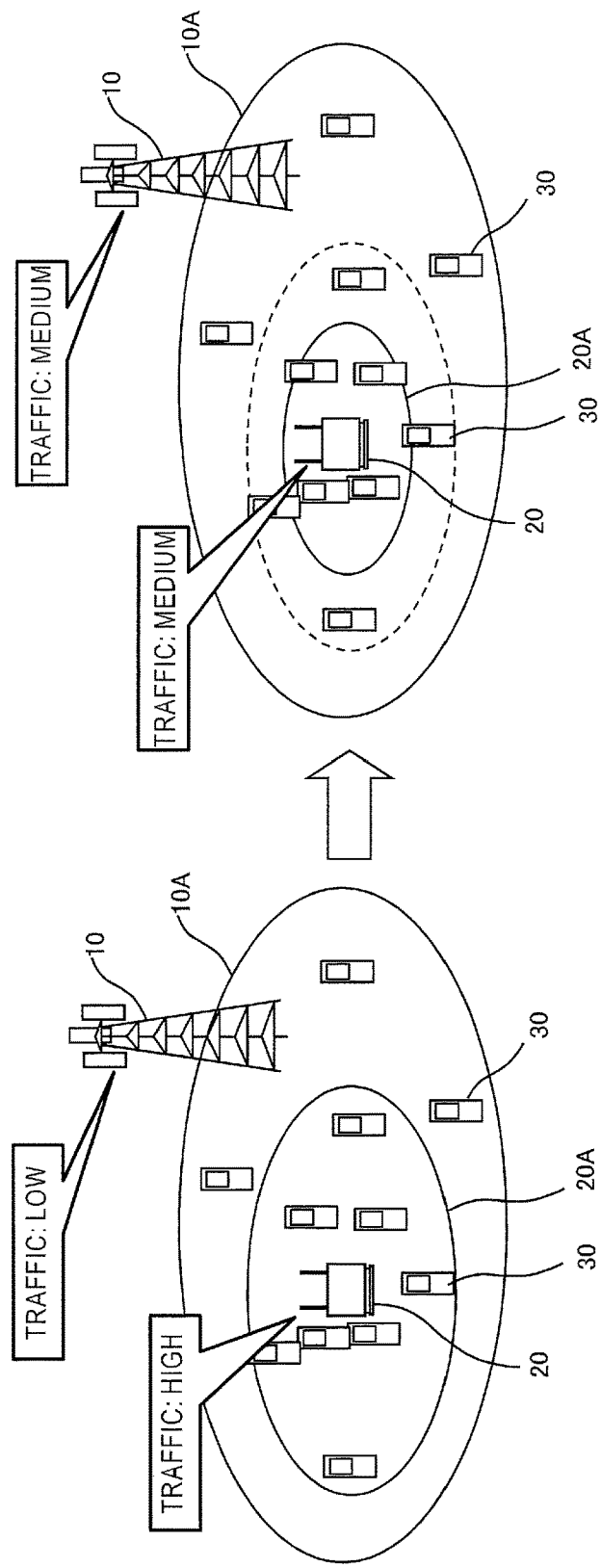
FIG. 10 is an illustration showing a mobility load balancing function (MLB).

FIG. 10 is an illustration showing a mobility load balancing function (MLB) capable of being applied to conventional mobile communication systems (see the Non-Patent Literature 3). This mobility load balancing function (MLB) is, for example, a function of changing a handover-related parameter in the small-cell base station 20 and narrowing an effective cell radius of the small cell 20A, when a load of the small-cell base station 20 becomes high by increasing the traffic in the small cell 20A of the small-cell base station 20 located in the macro cell 10A. By this function, it is capable of making the user equipment (UE), which locates at a cell edge of the small cell 20A, hand over (hand out) to the macro cell (neighboring cell) 10A, and reducing the load of the small-cell base station 20.

However, as described in the followings, in case that the foregoing mobility load balancing function (MLB) is applied, when the UE properly existing in a cell according to a receiving level of signals from a base station is handed out in a forced or compulsory manner, the UE after handing out receives high interference. Furtheremore, when a plurality of UE concentrates at the center of small cell 20A, even if the foregoing mobility load balancing function (MLB) is applied, it is not capable of making the UE hand over (hand out) to the macro cell (neighboring cell) 10A and reducing the load of small-cell base station 20.

Figure 11A:
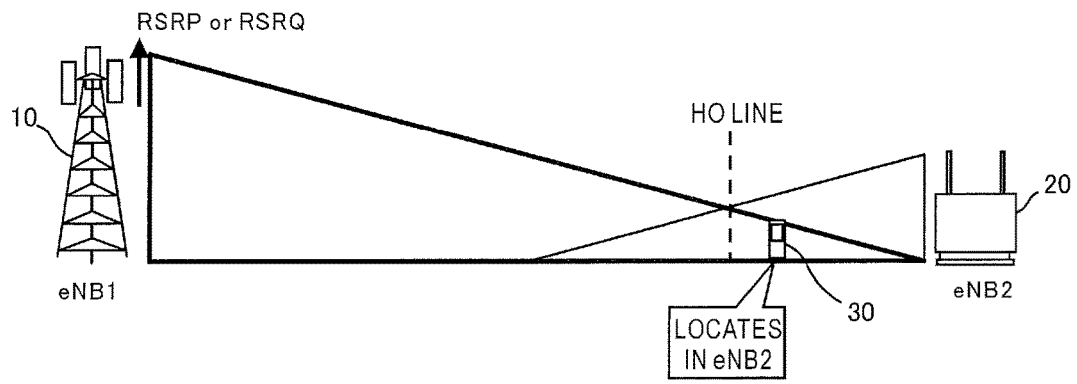
FIG. 11A is an illustration showing a problem when applying the mobility load balancing function (MLB).
Figure 11B:
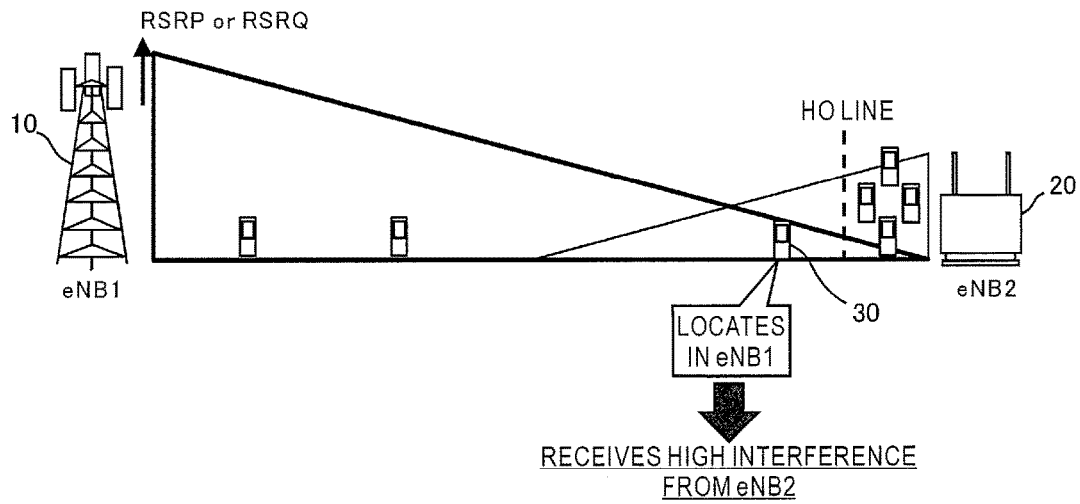
FIG. 11B is an illustration showing a problem when applying the mobility load balancing function (MLB).
Figure 11C:
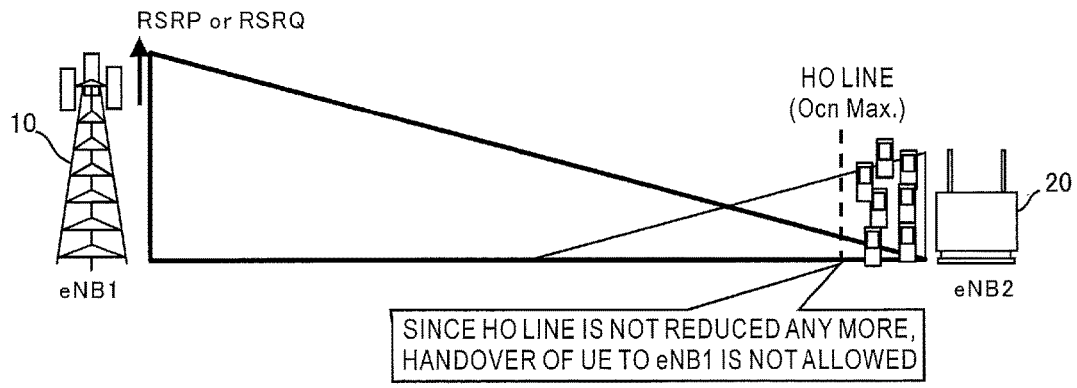
FIG. 11C is an illustration showing a problem when applying the mobility load balancing function (MLB).

FIGS. 11A to 11C are illustrations showing a problem when applying the mobility load balancing function (MLB). The horizontal axis in the figures shows locations between the macro-cell base station (eNB1) 10 and the small-cell base station (eNB2) 20 and the vertical axis shows a pilot signal power (RSRP) that is signal intensity of a downlink transmission signal received by the UE 30 or a pilot signal quality (RSRQ) that is a signal quality of the received downlink transmission signal.

FIG. 11A is an illustration in case that the load of small-cell base station 20 is small. As described above, since a handover is performed by determining based on the RSRP/RSRQ in the UE, the UE locates in the cell (small cell 20A in case shown in the figure) in which the RSRP/RSRQ is high.

FIG. 11B is an illustration in case that the load of small-cell base station 20 becomes high. When the number of UE existing in the small-cell base station 20 increases and the load of small-cell base station 20 becomes high, if the mobility load balancing function (MLB) is applied, a HO line moves toward the small-cell base station 20. By this shift, in spite of the high RSRP/RSRQ of signals from the small-cell base station 20, the UE locating at the cell edge is handed out to the macro cell 10A in a forced or compulsory manner. Accordingly, the UE after handing out receives high interference from the small cell 20A.

FIG. 11C is an illustration in case that the number of UE increases and the load of small-cell base station 20 becomes large. In this case, even if the offset (Ocn) of handover is increased to the maximum allowable value and the HO line is moved to the limit toward the small-cell base station 20, it is not capable of making a number of UE 30, which locates near the small-cell base station 20, hand out to the macro cell 10A. Accordingly, it is not capable of solving the increase of load in the small-cell base station 20.

Accordingly, in the base station apparatus 200 of the small-cell base station 20 according to the present embodiment, as shown in the followings, interference to the UE 30 that hands out from the highly loaded small cell is reduced and a proper load balancing is achieved, by adjusting an offset (Ocn) of handover and controlling so as to decrease a setting of downlink transmission power when performing the foregoing mobility load balancing function (MLB).

Figure 12:
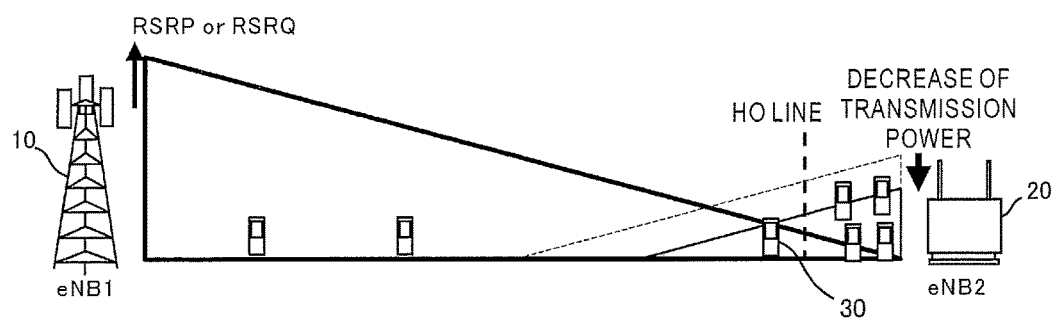
FIG. 12 is an illustration showing an example of controlling a downlink transmission power when performing the mobility load balancing function (MLB), according to a third embodiment of the present invention.
Figure 13:
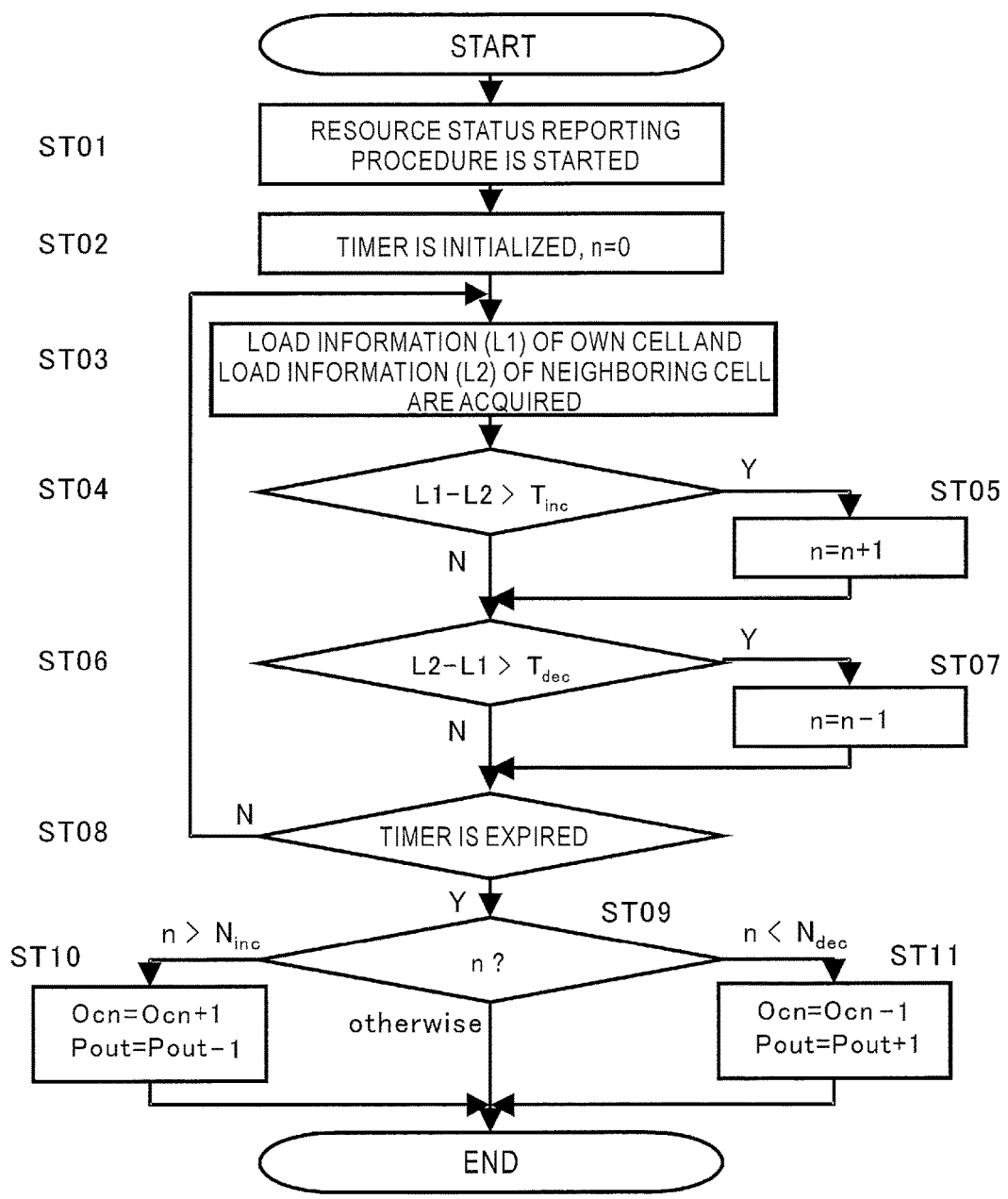
FIG. 13 is a sequence diagram showing the same example of controlling the downlink transmission power.

FIG. 12 is an illustration showing an example of controlling a downlink transmission power when performing the mobility load balancing function (MLB), according to a third embodiment of the present invention. FIG. 13 is a sequence diagram showing the same example of controlling the downlink transmission power. It is noted that, in FIGS. 12 and 13, the base station eNB1 is a macro-cell base station 10 and the base station eNB2 is a small-cell base station 20 located in the macro cell 10A.

In the present example of control, as shown in the following procedures (1) to (7), the downlink transmission power is controlled when performing the mobility load balancing function (MLB).

(1) The eNB2 starts a resource-status reporting procedure (Resource Status Reporting Procedure). Specifically, the eNB2 transmits a resource-status reporting request (Resource Status Reporting Request) to the eNB1 of neighboring cell, and when the eNB2 receives a resource-status response (Resource Status Response) from the eNB1, the present resource-status reporting procedure starts (ST01).

(2) A timer and a counter (n) indicating a load state of the eNB2 are initialized (ST02).

Figure 14:
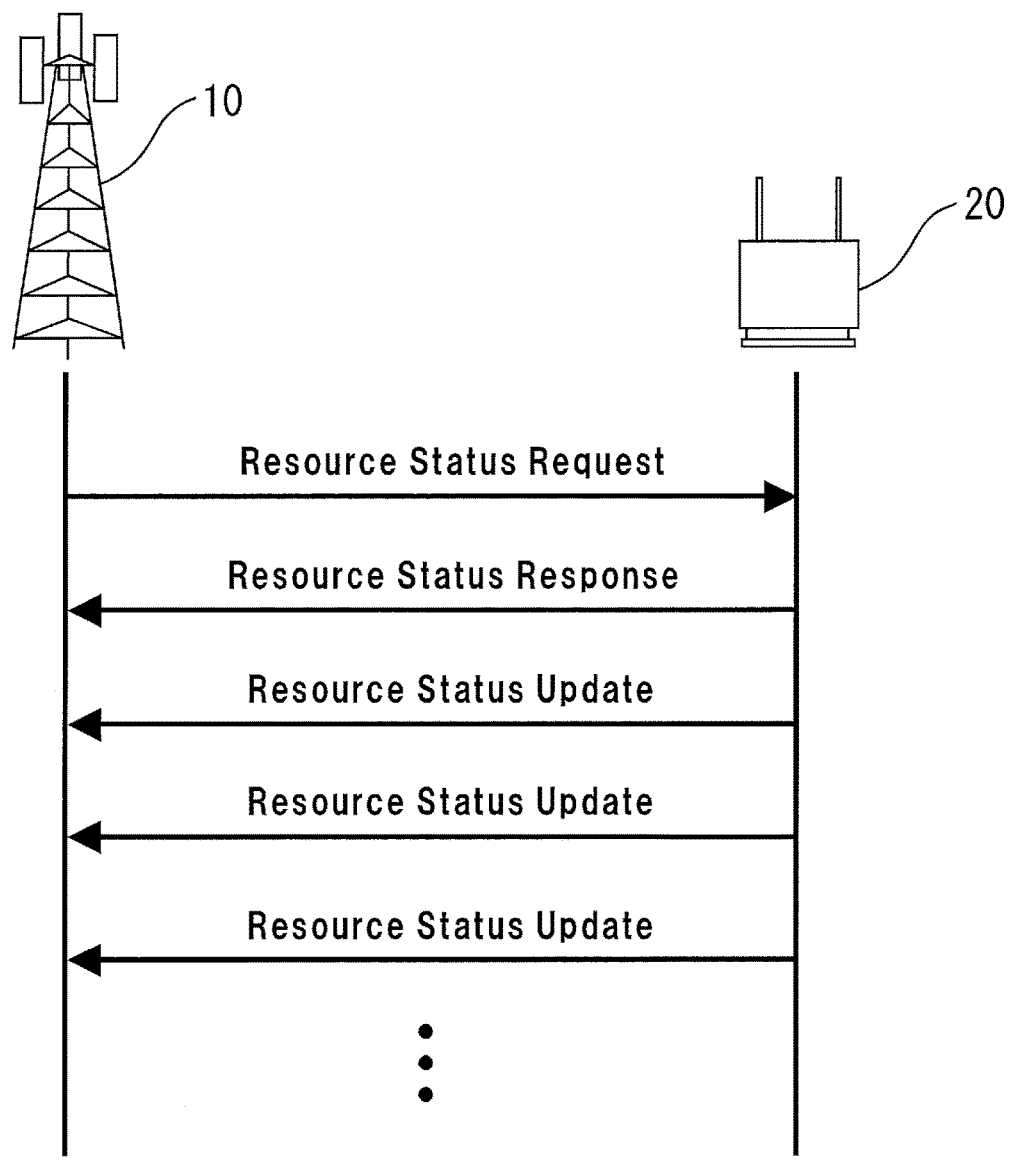
FIG. 14 is a sequence diagram showing an example of communication control when transceiving load information between base stations.

(3) Load information L1 (radio-resource use rate, etc.) of the own cell is acquired. At the same time, load information L2 of a neighboring cell is acquired from a resource status update (Resource Status Update) received from the neighboring cell (ST03). Herein, the load information L2 of the neighboring cell can be acquired, for example, by communication control procedures via the X2 interface between base stations, which are shown in FIG. 14 (see the Non-Patent Literature 4).

(4) When the difference (L1−L2) between the L1 and the L2 is equal to or larger than a predetermined threshold Tinc, that is, the load L1 of the own cell is higher than the load L2 of the neighboring cell, the counter (n) is incremented (ST04, 05).

(5) When the difference (L2−L1) between the L2 and the L1 is equal to or larger than a predetermined threshold Tdec, that is, the load L2 of the neighboring cell is higher than the load L1 of the own cell, the counter (n) is decremented (ST06, 07).

(6) The foregoing procedures (3) to (5) are repeated before the timer is expired (ST08).

(7) After the timer is expired, the value of the counter (n) is checked (ST09). When the counter (n) is larger than a predetermined threshold (Ninc), the offset Ocn of handover is increased and the downlink transmission power Pout is decreased (ST10). When the counter (n) is smaller than another threshold (Ndec), the offset Ocn of handover is decreased and the downlink transmission power Pout is increased (ST11).

According to the foregoing example of control in FIGS. 12 and 13, the base station apparatus 200 of the small-cell base station 20 controls so as to decrease the setting of downlink transmission power Pout when performing the mobility load balancing function (MLB) for increasing the offset Ocn of handover. By this control, it is capable of reducing the interference to the UE handed out from the highly loaded small cell 20A and achieving the proper load balancing.

It is noted that, in the foregoing procedure (4) of the example of control in FIGS. 12 and 13, it may be controlled that the load L1 of the own cell is determined to be higher than the load L2 of the neighboring cell and the counter (n) is incremented, when the difference (L1−L2) between the L1 and the L2 is larger than the predetermined threshold Tinc.

Furthermore, in the procedure (5), it may be controlled so that the load L2 of the neighboring cell is determined to be higher than the load L1 of the own cell and the counter (n) is decremented, when the difference (L2−L1) between the L2 and the L1 is larger than the predetermined threshold Tdec.

Moreover, in the procedure (7), it may be controlled so that the offset Ocn of handover is increased and the downlink transmission power Pout is decreased, when the counter (n) is equal to or larger than the predetermined threshold (Ninc). Further, the offset Ocn of handover may be decreased and the downlink transmission power Pout is increased, when the counter (n) is equal to or smaller than another threshold (Ndec).

Embodiment 4

Figure 15:
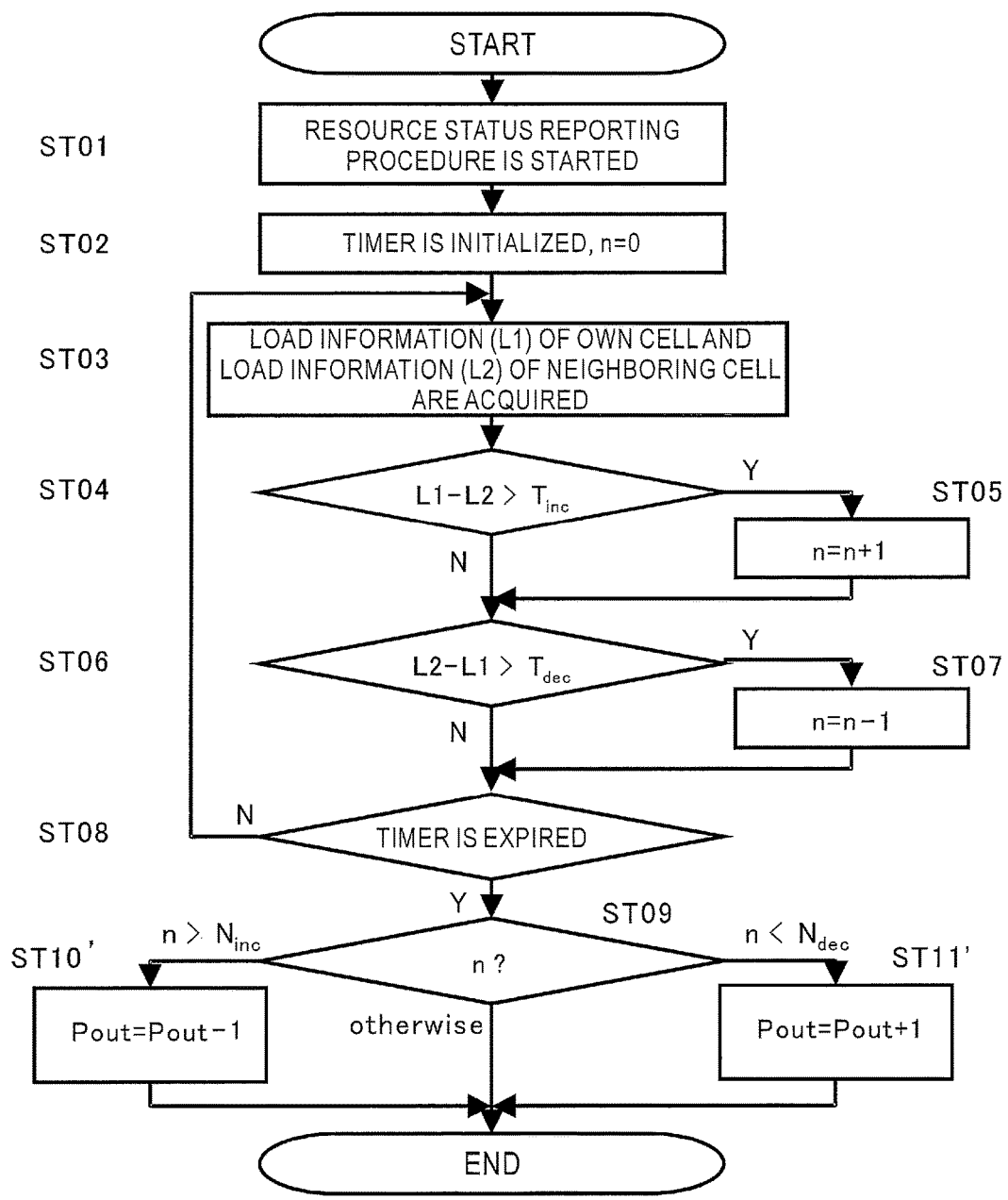
FIG. 15 is a flowchart showing an example of controlling a downlink transmission power when performing the mobility load balancing function (MLB), according to a fourth embodiment of the present invention.

FIG. 15 is a flowchart showing an example of controlling a downlink transmission power when performing the mobility load balancing function (MLB), according to a fourth embodiment of the present invention. It is noted that a description of the same or substantially the same part as that of the flowchart in FIG. 13 will be omitted. In the example of control in FIG. 15, while not adjusting the offset Ocn of handover, only the setting of downlink transmission power Pout is adjusted in the ST10 and 11. According to the example of control in FIG. 15, it is also capable of reducing the interference to the UE handed out from the highly loaded small cell 20A and achieving the proper load balancing.

Embodiment 5

Figure 16:
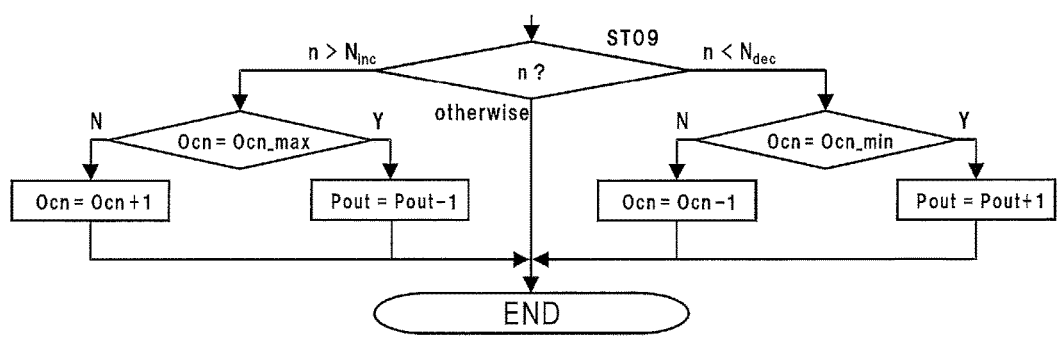
FIG. 16 is a flowchart showing an example of controlling a downlink transmission power when performing the mobility load balancing function (MLB), according to a fifth embodiment of the present invention.

FIG. 16 is a flowchart showing an example of controlling a downlink transmission power when performing the mobility load balancing function (MLB), according to a fifth embodiment of the present invention. It is noted that a description of the same or substantially the same part as that of the flowchart in FIG. 13 will be omitted. In the example of control in FIG. 16, the offset Ocn of handover is preferentially adjusted, then after the value of offset Ocn reaches a predetermined maximum value or minimum value, the setting of downlink transmission power Pout is adjusted, in the ST10 and 11. According to the example of control in FIG. 16, it is also capable of reducing the interference to the UE handed out from the highly loaded small cell 20A and achieving the proper load balancing.

It is noted that, although it is described that the downlink transmission power is controlled in the base station apparatus 200 of the small-cell base station 20 when performing the mobility load balancing function (MLB) in the foregoing embodiments 3 to 5, the same control may be performed in a base station apparatus of the macro-cell base station 10.

It is also noted that the description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 10 macro-cell base station (peripheral base station)
10A macro cell
20 small-cell base station
20A small cell
30 user equipment (mobile station)

The invention claimed is:

1. A base station apparatus installed in a small-cell base station of a small cell, the small-cell base station and the small cell being located in a macro cell, which communicates with a mobile station in a mobile communication network, the base station apparatus in the small-cell base station comprising:
a control section that acquires load information L1 of the small cell located in the macro cell and load information L2 of the macro cell including the small cell, increments a counter n when the difference (L1−L2) between the L1 and the L2 is larger than a preset threshold Lth within a predetermined time, adjusts a setting of an offset (Ocn) for the macro cell in a conditional expression for handover from the small cell to the macro cell to advance a hand-out from the small cell to the macro cell, including by increasing the setting of offset (Ocn) when the incremented value of the counter n within the predetermined time is larger than a predetermined number of times Ninc before a control of a downlink transmission power of the small-cell base station, and controls a decreasing of the downlink transmission power of the small-cell base station to decrease an interference from the small cell to the mobile station handovered from the small cell to the macro cell when the setting of offset (Ocn) is increased after the adjusted value of offset Ocn reaches a predetermined maximum value or minimum value.

2. The base station apparatus according to claim 1, wherein the control section controls to decrement the counter n when the difference (L2−L1) between the L1 and the L2 is larger than the preset threshold Tdec or the difference (L2−L1) is equal to or larger than the threshold Tdec within a predetermined time, to decrease the setting of offset (Ocn) to delay the hand-out from the small cell to the macro cell when the incremented value of the counter n within the predetermined time is smaller than a predetermined number of times Ndec or the incremented value is equal to or smaller than the predetermined number of times Ndec, and controls to increase the downlink transmission power of the small-cell base station when the setting of offset (Ocn) is decreased.

3. The base station apparatus according to claim 2, wherein the control section preferentially performs the setting change of the offset (Ocn) for handover and performs the control to increase the downlink transmission power after the offset (Ocn) become a predetermined maximum value or minimum value.

4. The base station apparatus according to claim 1, wherein the counter n is incremented when the difference (L1−L2) is equal to or larger than the threshold Lth.

5. The base station apparatus according to claim 1, wherein the offset (Ocn) is increased when the incremented value of the counter n within the predetermined time is equal to or larger than the predetermined number of times Ninc.

6. For a base station apparatus installed in a small-cell base station of a small cell, the small-cell base station and the small cell located in a macro cell and in communication with a mobile station in a mobile communication network, a method comprising:
acquiring load information L1 of the small cell and load information L2 of the macro cell;
if a difference (L1−L2) between the L1 and the L2 is larger than a first preset threshold within a predetermined time, incrementing a counter n;
performing a first adjustment of a value of an offset for the macro cell in a conditional expression for handover from the small cell to the macro cell, including increasing the value of the offset if the incremented value of the counter n within the predetermined time is larger than a predetermined value, Ninc; and
in response to the adjusted value of the offset reaching a predetermined maximum value or minimum value, controlling a decrease in a downlink transmission power of the small-cell base station.

7. The method according to claim 6, wherein decreasing the downlink transmission power decreases an interference from the small cell to the mobile station handovered from the small cell to the macro cell when the value of the offset is adjusted.

8. The method according to claim 6, wherein performing the first adjustment of the value of the offset advances a hand-out from the small cell to the macro cell.

9. The method according to claim 6, wherein the first adjustment is an increase of the value of the offset.

10. The method according to claim 6, further comprising:
if a difference (L2−L1) between the L1 and the L2 is larger than a second preset threshold within a predetermined time, decrementing the counter n;
if the incremented value of the counter n within the predetermined time is smaller than a predetermined value, Ninc, performing a second adjustment of the value of the offset; and
controlling an increase in the downlink transmission power of the small-cell base station if the second adjustment of the value of the offset is performed.

11. The method according to claim 10, wherein performing the second adjustment of the value of the offset delays a hand-out from the small cell to the macro cell.

12. The method according to claim 11, wherein the increase in the downlink transmission power is controlled after the value of the offset becomes a predetermined maximum value or predetermined minimum value.

13. The method according to claim 11, wherein the second adjustment is a decrease of the value of the offset.

* * * * *